(12) United States Patent
Fyfe et al.

(10) Patent No.: US 10,039,143 B2
(45) Date of Patent: Jul. 31, 2018

(54) WIRELESS SENSOR POD USES TRIGGER EVENTS FOR PAIRING AND TESTING

(71) Applicant: 4iiii Innovations Inc., Cochrane (CA)

(72) Inventors: Kipling William Fyfe, Cochrane (CA);
Gregory Charles Lund, Calgary (CA);
Billy Cheuk Wai Chan, Calgary (CA);
Thomas Richard Williams, Edmonton (CA)

(73) Assignee: 4iiii Innovations Inc., Cochrane (CA)

(*) Notice: Subject to any disclaimer, the term of this patent is extended or adjusted under 35 U.S.C. 154(b) by 244 days.

(21) Appl. No.: 14/757,911

(22) Filed: Dec. 24, 2015

(65) Prior Publication Data

US 2016/0192407 A1     Jun. 30, 2016

Related U.S. Application Data

(60) Provisional application No. 62/096,798, filed on Dec. 24, 2014.

(51) Int. Cl.

| | |
|---|---|
| *H04W 76/10* | (2018.01) |
| *H04W 84/18* | (2009.01) |
| *H04W 24/06* | (2009.01) |
| *H04W 8/00* | (2009.01) |

(Continued)

(52) U.S. Cl.
CPC ........... *H04W 76/10* (2018.02); *H04W 4/008* (2013.01); *H04W 4/80* (2018.02); *H04W 8/005* (2013.01); *H04W 24/06* (2013.01); *H04W 84/18* (2013.01)

(58) Field of Classification Search
CPC .... H04L 61/6081; H04L 67/12–67/125; H04L 2209/80–2209/805; H04W 4/005–4/046; H04W 8/005; H04W 12/06; H04W 24/06–24/10; H04W 60/04; H04W 76/02; H04W 76/023; H04W 76/027; H04W 84/18–84/22

See application file for complete search history.

(56) References Cited

U.S. PATENT DOCUMENTS

| | | |
|---|---|---|
| 8,957,777 B2 | 2/2015 | Baker et al. |
| 2005/0193820 A1 | 8/2005 | Shljaskow et al. |

(Continued)

OTHER PUBLICATIONS

PCT/IB2015/002593 International Search Report and Written Opinion dated Mar. 21, 2016, 8 pages.

(Continued)

*Primary Examiner* — Timothy J Weidner
(74) *Attorney, Agent, or Firm* — Lathrop Gage LLP (57) ABSTRACT

A wireless sensor pod and associated method use a trigger event to pair with a master device. The wireless sensor pod includes an inertial sensor for detecting physical movement of the wireless sensor pod, a wireless transceiver, a processor communicatively coupled to the inertial sensor and the wireless transceiver, and a memory communicatively coupled with the processor and storing machine readable instructions. When the machine readable instructions are executed by the processor, they are capable of: detecting, using the inertial sensor, a first trigger event caused by the physical movement, and when the first trigger event is detected, transmitting, using the wireless transceiver, a communication to pair the wireless sensor pod with a master device.

5 Claims, 8 Drawing Sheets

(51) Int. Cl.
    *H04W 4/80*       (2018.01)
    *H04W 4/00*       (2018.01)

(56) References Cited

U.S. PATENT DOCUMENTS

| | | | | |
|---|---|---|---|---|
| 2012/0001751 A1* | 1/2012 | Baker | ............... | A61B 5/0024 340/539.12 |
| 2012/0254987 A1* | 10/2012 | Ge | ............... | H04L 63/0492 726/19 |
| 2014/0235166 A1 | 8/2014 | Molettiere et al. | | |

OTHER PUBLICATIONS

Sportiiiis User Manual? Retrieved from https://web.archive.org/web/20141128052925/http:/4iiii.com/support/software-and-documentation, Sep. 2014 (Sep. 2014).

* cited by examiner

WIRELESS SENSOR POD USES TRIGGER EVENTS FOR PAIRING AND TESTING

RELATED APPLICATIONS

This application claims priority to U.S. Patent Application Ser. No. 62/096,798, titled "System And Method For Initiating An Actionable Process Within A Wireless Device Using Trigger Events," filed Dec. 24, 2014, which is incorporated herein by reference.

BACKGROUND

Pairing (enabling of communication) of devices using wireless communications is usually a manual multistep process. For example, a display may show a list of connectable (broadcasting) devices that the user must choose from, or there may be a PIN that is entered on each device after a device is switched to broadcasting/discoverable. This is made difficult where devices have no display and no keypad.

SUMMARY

In one embodiment, a method pairs a wireless sensor pod using trigger events. An inertial sensor within the wireless sensor pod detects a first trigger event caused by physical movement of the wireless sensor pod. When the first trigger event is detected, the wireless sensor pod transmits a communication to pair the wireless sensor pod with a master device.

In another embodiment, a wireless sensor pod is configured to use a trigger event to pair with a master device. The wireless sensor pod includes an inertial sensor for detecting physical movement of the wireless sensor pod, a wireless transceiver, a processor communicatively coupled to the inertial sensor and the wireless transceiver, and a memory communicatively coupled with the processor and storing machine readable instructions. When the machine readable instructions are executed by the processor, they are capable of: detecting, using the inertial sensor, a first trigger event caused by the physical movement, and when the first trigger event is detected, transmitting, using the wireless transceiver, a communication to pair the wireless sensor pod with a master device.

DETAILED DESCRIPTION OF THE EMBODIMENTS

Where a device has no display and/or no keypad, pairing the device to another device by entering a PIN is not possible. For example, a sports sensor pod that monitors a user's sporting activity is often small, to allow unobtrusive use when attached to the user or to equipment of the user, and therefore does not include a display or buttons (e.g., keypad). Therefore, a more convenient way of pairing the sensor pod would be useful. A simple method of pairing is initiated when a user imparts one or more physical changes, either simultaneously or sequentially, to the master device and the sensor pod. Trigger sensors within the master device and sensor pods detect these physical changes as a trigger that initiates pairing of the master device and sensor pod together. Further, the sensor pod (and optionally the master device) may have multiple operational modes, where triggering within each operational mode initiates a particular function within the device and transmits a particular message, for example.

When multiple sensor pods are triggered, e.g. during shipping and/or manufacturing, the expected number of devices may be known either through reference to a database (perhaps cloud based) or from the transmitted message itself and this expected number may be compared to the number of received messages to determine if the expected number of devices are present and functional.

Overview

Figure 1:
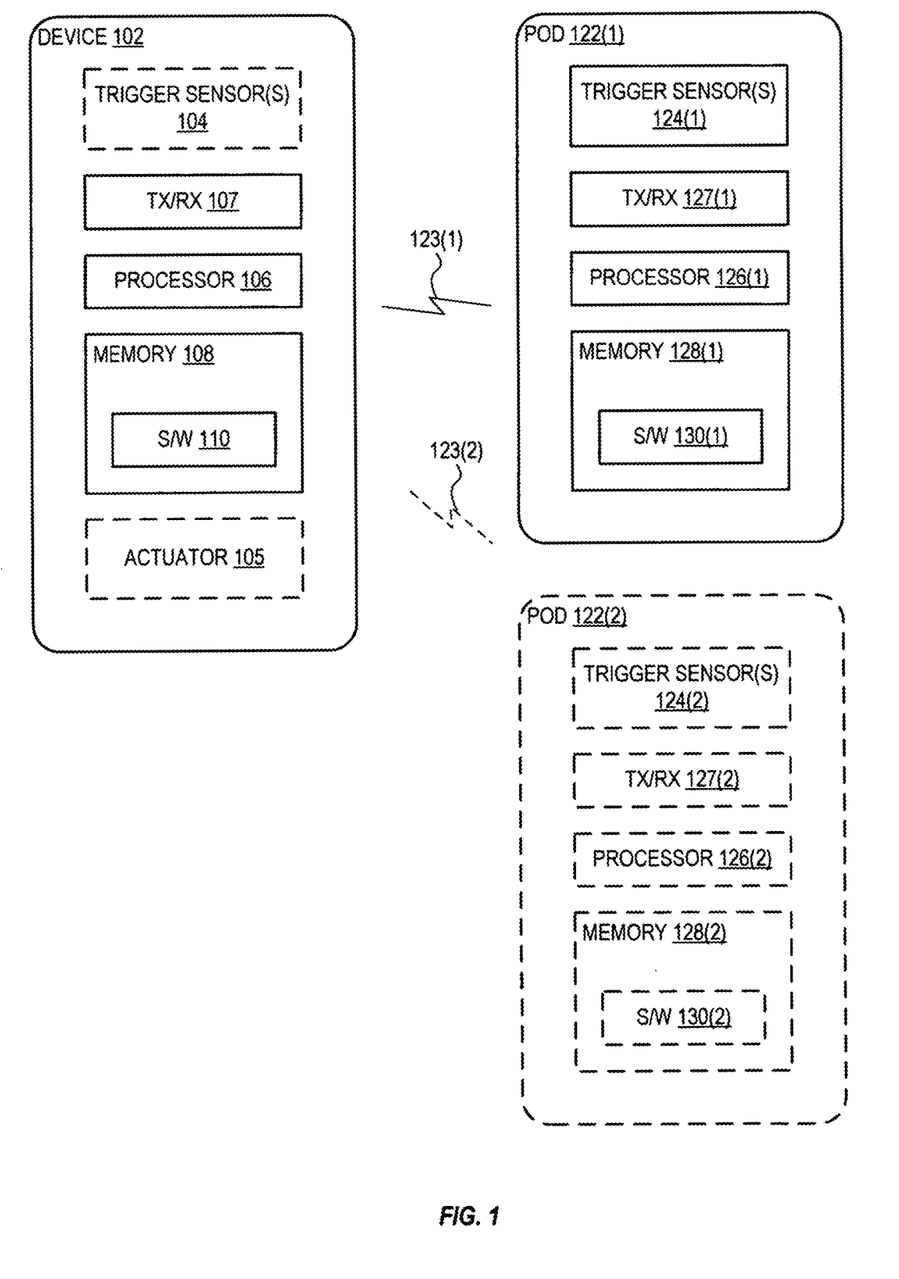
FIG. 1 shows one exemplary wireless sensor pod using trigger events for pairing with a master device and testing, in an embodiment.
Figure 2:
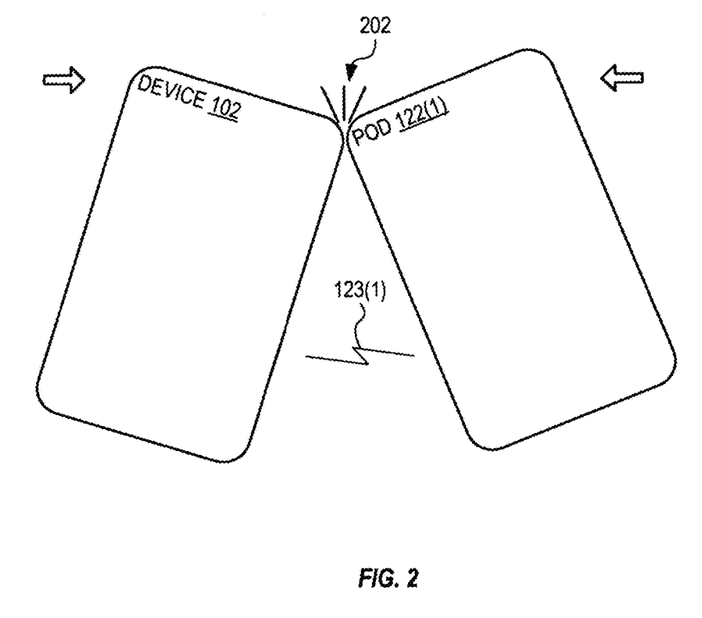
FIG. 2 shows exemplary triggering of the master device and sensor pod of FIG. 1 to initiate pairing and testing, in an embodiment.
Figure 3:
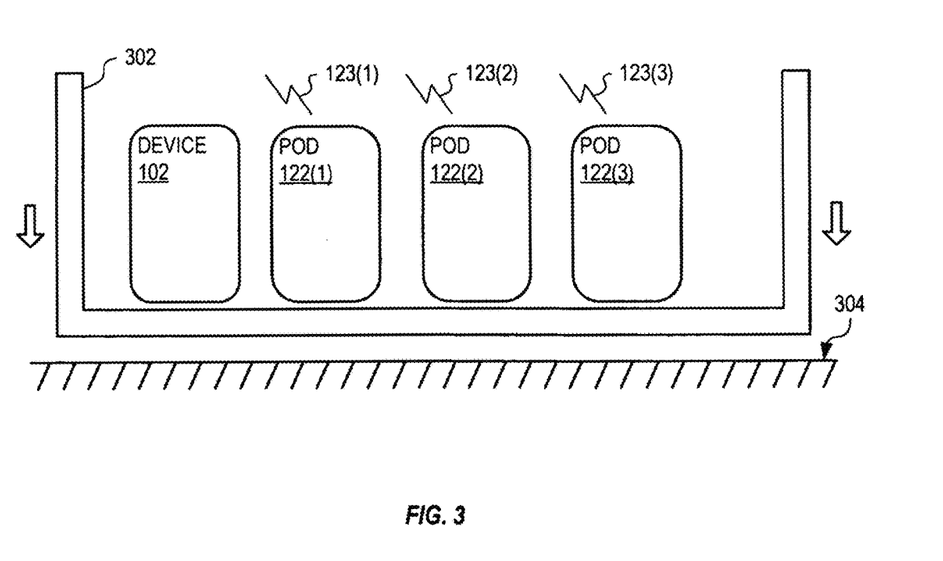
FIG. 3 shows the master device and sensor pods of FIG. 1 in a carton to illustrate exemplary many-to-one network architecture, in an embodiment.

FIG. 1 shows one exemplary wireless sensor pod 122 using trigger events for pairing with a master device 102 and testing. Master device 102 is for example a device with a display or other interface for communicating with a user. For example, master device 102 may represent one or more of: a smart phone, a bike computer, a tablet computer, and so on. That is, master device 102 has greater user interaction capability than sensor pod 122. FIG. 2 shows exemplary triggering of master device 102 and sensor pod 122 to initiate pairing and testing (e.g., a communication 123(1) from sensor pod 122(1) to master device 102). Triggering sensor pod 122 (and optionally master device 102) may invoke any one or more functions of master device 102 and/or sensor pod 122 as described herein. FIG. 3 shows master device 102 and sensor pods 122(1)-(3) in a carton 302 (e.g., a box, a container, a pallet, etc.), such as used for shipping, to illustrate exemplary many-to-one network architecture. FIGS. 1, 2 and 3 are best viewed together with the following description.

Master device 102 includes a transceiver 106, a processor 106, a memory 108, and optionally one or more trigger sensors 104. Memory 108 stores software 110 that includes machine readable instructions that are executed by processor 106 to provide the functionality described herein for master device 102. Optionally, master device 102 may include an actuator 105 for imparting vibration or motion to device 102. Use of optional actuator 105 is described in detail below.

Sensor pod 122 includes one or more trigger sensors 124, a transceiver 127, a processor 126, and a memory 128. In an embodiment, sensor pod 122 utilizes one or more sensors (e.g., trigger sensors 124 and/or other sensors—not shown) for detecting activity, performance, and other metrics, of a user. Memory 128 stores software 130 that includes machine readable instructions that are executed by processor 126 to provide the functionality described herein for sensor pod 122. Master device 102 uses transceiver 107 to receive signals from sensor pod 122. As shown in the example of FIG. 1, master device 102 may operate with more than one sensor pod 122. Master device 102 and sensor pod 122 may communicate using network architectures such as one-to-one, one-to-many, and many-to-one.

In the example of FIG. 3, the collection of master device 102 and sensor pods 122 has a definite cardinality, such as forming a set of devices that cooperate to perform a collective function. As shown, by tapping carton 302 on a hard surface 304, master device 102 and sensor pods 122 are triggered, and each sensor pod 122 generates a communication 123 that is received by master device 102. Communication 123 is for example a wireless signal transmitted from sensor pod 122 and received by master device 102. The expected number of devices in the collection may be transmitted within a communications 123(1) or be stored in a cloud-based database. Thus, master device 102 may detect when the number of communications is other than expected and may determine that one (or more) sensor pod(s) 122 has failed or is missing. Master device 102 may then alert a user, or other system, to the failure or deficit.

Figure 4:
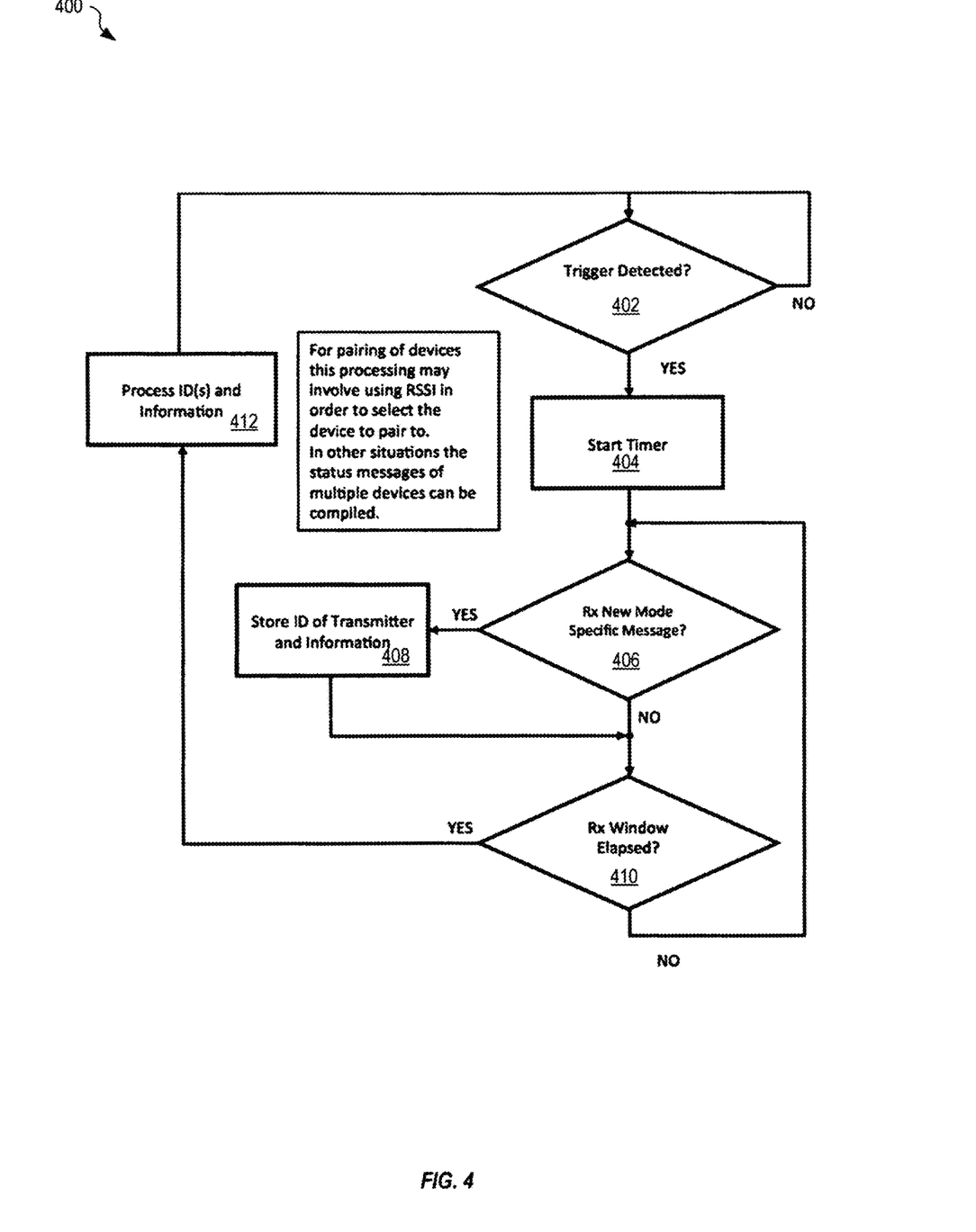
FIG. 4 is a flowchart illustrating one exemplary method for detecting a trigger and initiating a communication within the master device of FIG. 1, in an embodiment.
Figure 5:
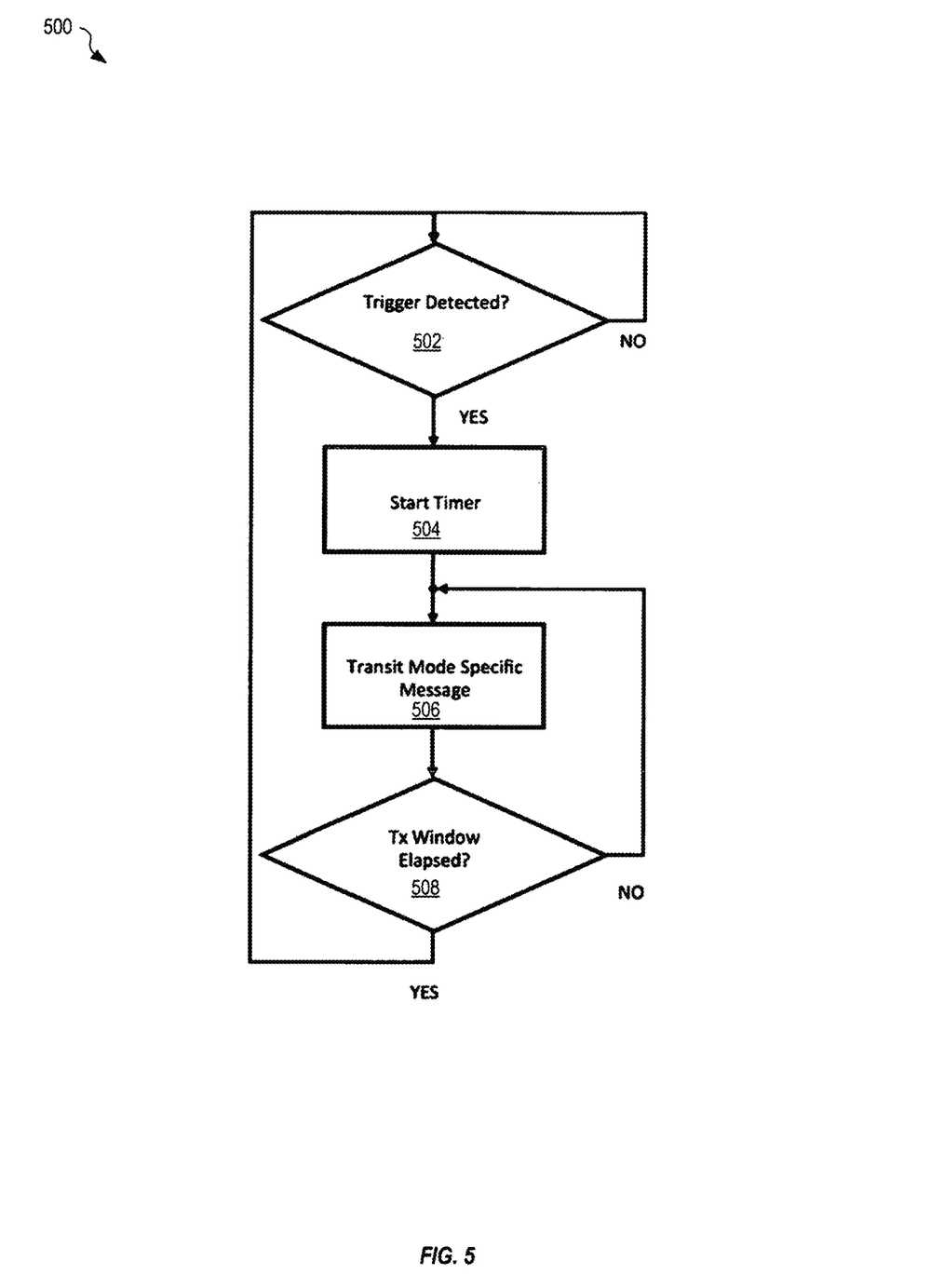
FIG. 5 is a flowchart illustrating one exemplary method for detecting a trigger and initiating a communication within the sensor pod of FIG. 1, in an embodiment.

FIG. 4 is a flowchart illustrating one exemplary method 400 for detecting a trigger and initiating a communication within master device 102 of FIG. 1. FIG. 5 is a flowchart illustrating one exemplary method 500 for detecting a trigger and initiating a communication within sensor pod 122 of FIG. 1. FIGS. 4 and 5 are best viewed together with the following description.

In the example of FIGS. 1, 2 and 3, the master device 102 may include trigger sensors 104 and each sensor pod 122 includes trigger sensors 124 for detecting trigger event 202 (e.g., physical tap as shown in FIGS. 2 and 3, or other signal that propagates to master device 102 and sensor pod 122). That is, trigger event 202 is a physical change to master device 102 and sensor pod 122 that is detected by trigger sensors 104, 124, respectively. For example, trigger sensors 104, 124 include at least one inertial sensor to detect trigger event 202, which is a movement of master device 102 and sensor pod 122. Trigger event 202 may be a sequence of predefined detectable physical activity, such as three taps of master device 102 against sensor pod 122 within one second, or other such detectable and discernable activities. That is, software 110 and 130 within master device 102 and sensor pods 122, respectively, includes functionality to discern and detect different trigger events 202.

Within master device 102, processor 106 executes instructions of software 110 to implement functionality of method 400, FIG. 4. Within each sensor pod 122, processor 126 executes instructions of software 130 to implement functionality of method 500, FIG. 5. Thus, within master device and sensor pod, upon detecting (steps 402 and 502, respectively) trigger event 202, a predefined sequence of events (steps 404 through 412 and steps 504 through 508, respectively) is executed. This sequence includes broadcasting (step 506) a specific message (e.g., communication 123) for a defined period and/or listening (steps 406 and 408) for a specific class of message (e.g., communication 123).

Exemplary Operation within the Master Device

Step 402 of method 400 is a decision. If method 400 determines that a trigger event has been detected, method 400 continues with step 404; otherwise method 400 repeats step 402. In one example of step 402, trigger sensors 104 detect trigger event 202. In step 404, method 400 starts a timer. In one example of step 404, software 110 instructs processor 106 to start a timer therein.

Step 406 is a decision. If, in step 406, method 400 determines that a new mode specific message has been received, method 400 continues with step 408; otherwise, method 400 continues with step 410. In one example of step 406, master device 102 receives message 123 via transceiver 107. In step 408, method 400 stores an ID of the transmitter and other information. In one example of step 408, processor 106 stores an ID, received in communication 123, of sensor pod 122 within memory 108. Method 400 continues with step 410.

Step 410 is a decision. If, in step 410, method 400 determines that the receive window has elapsed, method 400 continues with step 412; otherwise, method 400 continues with step 406. In one example of step 410, if the timer started in step 404 has not matured, device 102 continues to listens using transceiver 107 for communication 123.

In step 412, method 400 processed the IDs and other information stored in step 408. In one example of step 412, software 110 and processor 106 cooperate to pair device 102 with sensor pod 122. Method 400 then continues with step 402. Steps 402 through 412 repeat for each trigger of device 102.

Exemplary Operation within the Sensor Pod

Step 502 of method 500 is a decision. If, in step 502, method 500 determines that a trigger has been detected, method 500 continues with step 504; otherwise, method 500 continues with step 502. In one example of step 502, trigger sensors 124 detect trigger event 202. In step 504, method 500 starts a timer. In one example of step 504, software 130 instructs processor 126 to start a timer therein. In step 506, method 500 transmits a mode specific message. In one example of step 506, software 130 instructs processor 126 to transmit, via transceiver 127, message 123 based upon a current mode of sensor pod 122.

Step 508 is a decision. If, in step 508, method 500 determines that the transmit window has expired, method 500 continues with step 502; otherwise, method 500 continues with step 506. In one example of step 508, if processor 126 determines that the timer started in step 504 has not matured, step 506 is repeated to re-transmit message 123.

Communication 123 may depend upon a current mode of the transmitting device. That is, the same trigger event 202 may elicit a different content of communication 123 based upon a current mode of sensor pod 122. In one embodiment, communication 123 includes a time, either relative or absolute, of the detection of trigger event 202. Alternatively, sensor pod 122 may be configured to respond differently to each of a plurality of different and discernable trigger events. In one embodiment, each sensor pod 122 operates in one of four different modes: manufacturing, shipping, user, and diagnostic. Each of these modes may also have sub-modes, through which sensor pod 122 progresses sequentially or upon receipt of a certain trigger event.

Within master device 102, software 110 may implement logic to determine (steps 408 and 412) with which sensor pod 122 to continue communication based upon received communications 123.

Modalities

A number of different connection modalities are envisaged. These include, but are not limited to: single device triggering, multiple device triggering, simultaneous device triggering, and sequential device triggering.

For single device triggering, a first device is either a master (e.g., master device 102) and listens or is a slave (e.g., sensor pod 122) and transmits. When a second device is triggered, it starts to transmit (if the first device is a master) or receive (if the first device is a slave) a specific message.

In one example of single device triggering, master device 102 is in receive (listening) mode. Sensor pod 122 starts transmitting a specific communication 123 when triggered, and the communication 123 is received by the master device. In another example of single device triggering, sensor pod 122 periodically or occasionally transmits communication 123. Master device 102 starts receiving (listening) for the communication when triggered and receives communication 123 when next transmitted from sensor pod 122.

For multiple device/pod triggering, a first device is either a master (e.g., master device 102) and is listening or is a slave (e.g., sensor pod 122) and transmits. Then, multiple second devices are triggered and start to transmit (if the first device is a master) or receive (if the first device is a slave) a specific message. This pairing method may be used where multiple second devices in a box are triggered to pair with a first device, for example.

For simultaneous device triggering, both a first and a second device are triggered at the same time to initiate communication. For example, simultaneous device triggering occurs when the first and second devices (e.g., master device 102 and sensor pod 122, respectively) are tapped against each other and an inertial sensor (e.g., an accelerometer) in each device detects the tap and initiates the action corresponding to the trigger. In an alternative example, the first and second devices are tapped at the same time, but in distinct locations, and an inertial sensor in each device initiates the trigger. Other triggers and appropriate sensors for detecting the trigger may be used without departing from the scope hereof.

For sequential device triggering, a first device (e.g., master device 102) is triggered, e.g., by tapping the device, and a second device (e.g., sensor pod 122) is triggered, again by tapping, within a period from the first triggering. For example, after tapping the first device, a user taps the second device within a 5 second period from the first tap to trigger the second device and initiate communication between the two devices.

Improved Pairing Security

In one embodiment, devices 102 and 122 are held physically touching one another, and actuator 105 is controlled by processor 104 running software 110 to generate a particular pattern of movement and/or vibration, for example after a first triggering of master device 102. For example, the pattern may be based upon a randomly generated pulse sequence over a one second period that drives actuator 105 to cause physical movement of sensor pod 122. For example, the sequence may have variation in one or both of period and intensity. Sensor pod 122 is triggered by the physical movement caused by actuator 105 and sends communication 123, containing a representation (e.g., an indication of period and/or intensity) of the sensed sequence to master device 102. Master device 102 compares the sensed sequence with the generated sequence to authenticate communication 123 and to optionally form a communication link (e.g., pair) with sensor pod 122. Communication 123 may include other information (e.g., a time, relative or absolute, of detection of trigger vent, without departing from the scope hereof.

Similarly, a user of devices 102 and 122 may generate a trigger event by tapping devices 102 and 122 together using a sequence of movements. Devices 102 and 122 are both triggered by the physical tapping, and each records a representation (e.g., an indication of period and/or intensity) of the sequence. Sensor pod 122 then sends communication 123, containing its representation of the trigger event to master device 102. Device 102 then authenticates communication 123 from sensor pod 122 by matching its sensed representation of the sequence to the representation of the sequence within communication 123. By using a sequence or pattern of physical movements, either automatically generated using actuator 105 or manually generated by the user, incorrect pairing may be avoided by ignoring communication 123 when the match fails.

In another embodiment, a user may record (e.g., by tapping master device 102) a sequence or pattern within master device 102 for later use in pairing sensor pod 122, where sensor pod 122 is triggered using the same predefined sequence or pattern of taps.

Multiple Mode Devices

Master device 102 and sensor pod 122 may each have multiple modes and when triggered, each initiates an actionable process, such as transmitting (or listening for) a mode-dependent communication, or performing a particular test. The triggering of the manufacturing mode testing may then be automatically or manually generated to progress sensor pod 122 to the next mode, such as shipping. Once sensor pod 122 has arrived and been accounted for, it would automatically or manually progress to the user mode.

Figure 6:
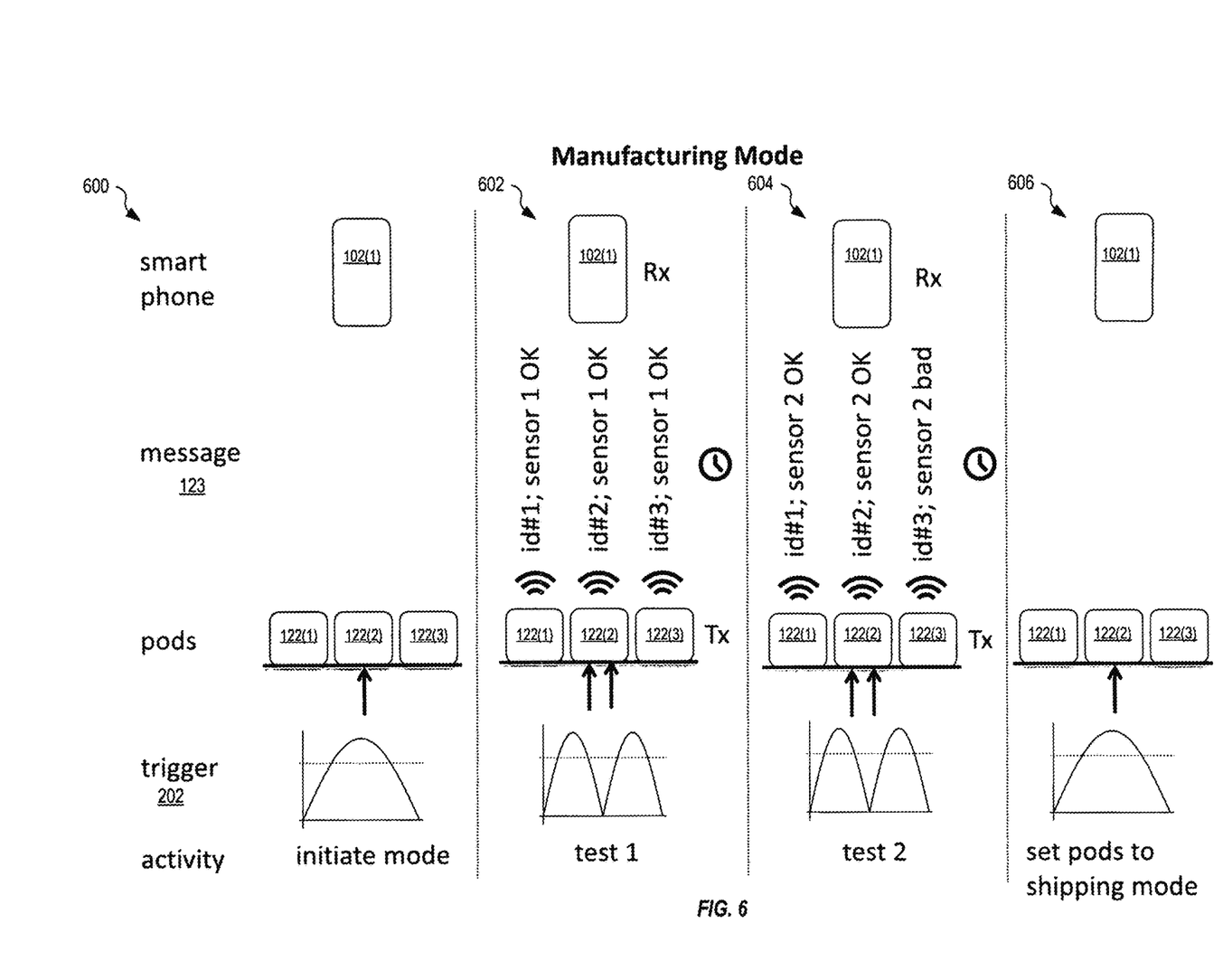
FIG. 6 is a schematic illustrating exemplary operation of the master device and the sensor pod of FIG. 1 in manufacturing mode, in an embodiment.
Figure 7:
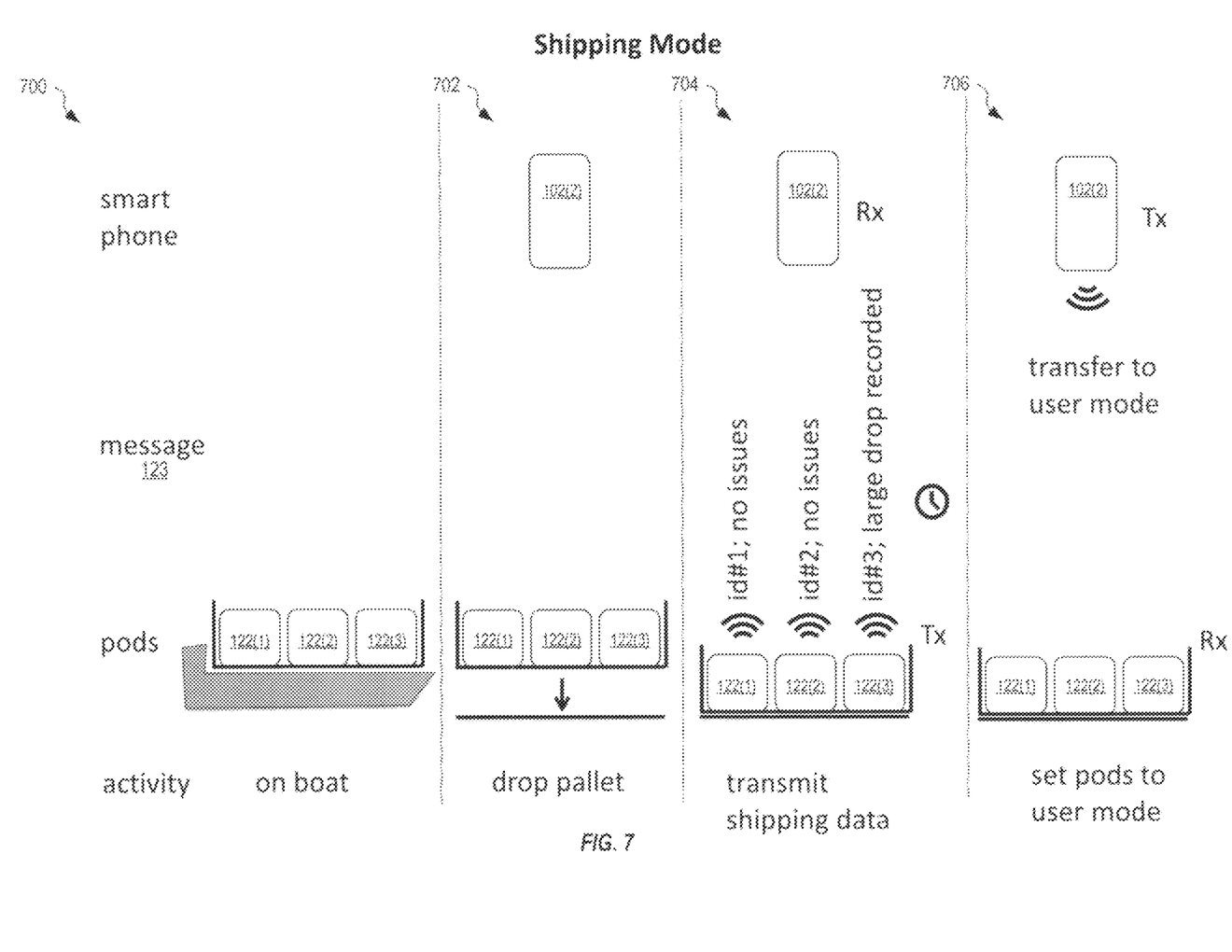
FIG. 7 is a schematic illustrating exemplary operation of the master device and the sensor pod of FIG. 1 in shipping mode, in an embodiment.
Figure 8:
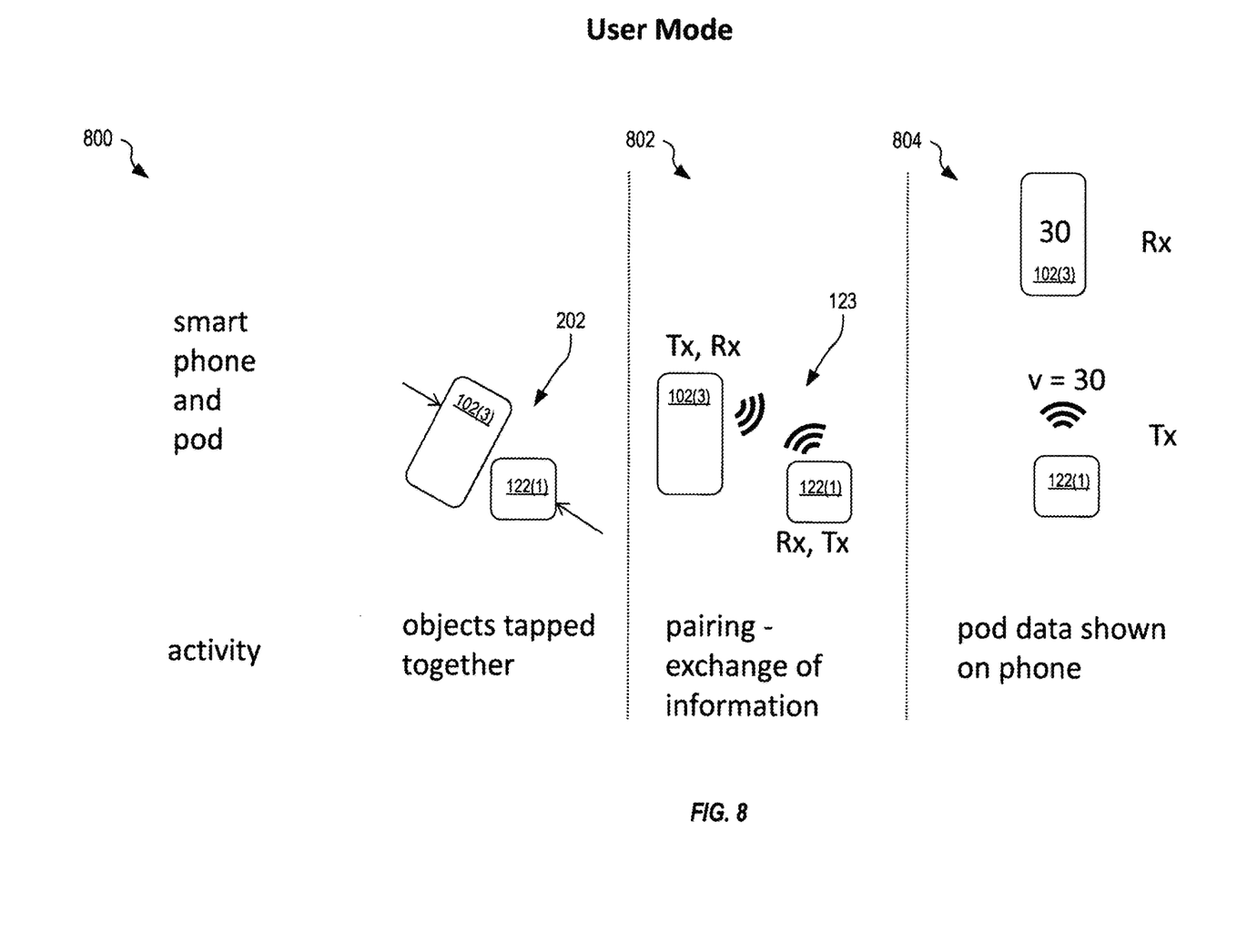
FIG. 8 is a schematic illustrating exemplary operation of the master device and the sensor pod of FIG. 1 in user mode, in an embodiment.
Figure 9:
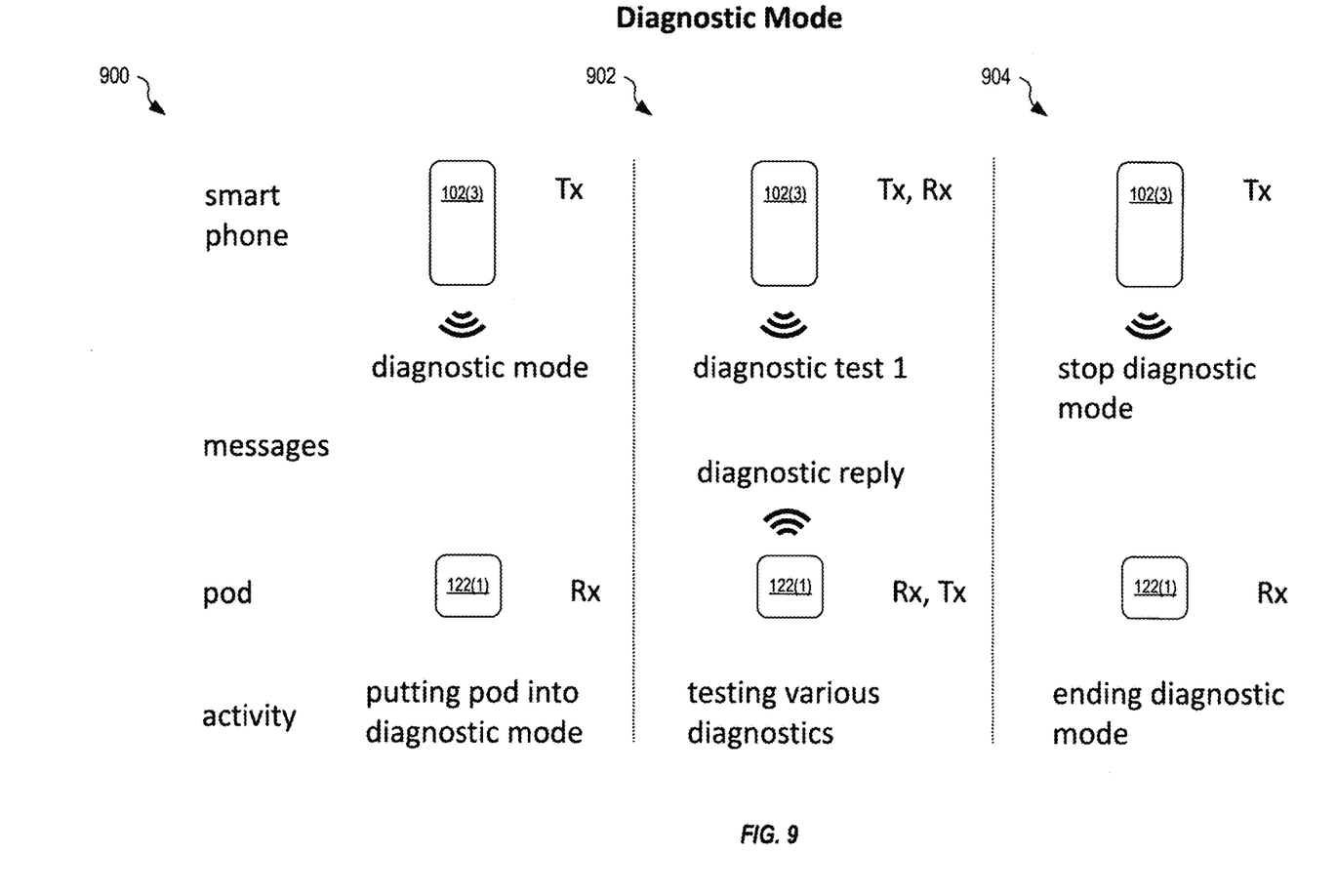
FIG. 9 is a schematic illustrating exemplary operation of the master device and the sensor pod of FIG. 1 in diagnostic mode, in an embodiment.

Using the above example, sensor pod 122 (and optionally master device 102) has four main modes: manufacturing, shipping, user, and diagnostic. FIG. 6 is a schematic illustrating exemplary operation of master device 102 and sensor pod 122 of FIG. 1 in manufacturing mode. FIG. 7 is a schematic illustrating exemplary operation of master device 102 and sensor pod 122 of FIG. 1 in shipping mode. FIG. 8 is a schematic illustrating exemplary operation of master device 102 and sensor pod 122 of FIG. 1 in user mode. FIG. 9 is a schematic illustrating exemplary operation of master device 102 and sensor pod 122 of FIG. 1 in diagnostic mode. FIGS. 6, 7, 8 and 9 are best viewed together with the following description. In the examples of FIGS. 6, 7, 8 and 9, master device 102 represents a smart phone, however, master device 102 may represent other devices without departing from the scope hereof.

Manufacturing:

during this mode, once the device (e.g., master device 102 and/or sensor pod 122) has been at least partially manufactured within a factory, a trigger event may cause the device to perform and/or report a result of a self-test (e.g. one or more of Received Signal Strength Indicator (RSSI) results and inertial sensor self-test). There may be multiple sub-modes within this main manufacturing mode, and progression between a sequence of sub-modes (e.g. progression through each of a plurality of tests as the device passes through an assembly line) may be based upon timing and/or receipt of one or more specific trigger events. In FIG. 6, scene 600 shows sensor pods 122 sitting on a conveyor belt and being triggered by a single bump or other physical change (i.e., trigger event 202) to sensor pods 122 in a detectable state to put them into manufacturing mode. Scene 602 shows trigger event 202 being applied as a double bump (or some other change in state) to sensor pod 122. Sensor pod 122 responds with a wireless message (i.e., communication 123) indicating their ID number and the state of their first sensor to master device 102 (e.g., a smartphone or test equipment) or other suitable receiver. In the example of FIG. 6, all sensor pods 122 indicate that they are OK. After some appropriate time, the receiver times out and stops listening for communications 123 from sensor pods 122. In scene 604, this process is repeated with another double bump trigger event 202. This time sensor pods 122(3) reports a problem with its second sensor. This process may repeat to perform additional tests as required. In scene 606, a different trigger event 202 is given to exit manufacturing mode and transition sensor pods 122 into the "shipping mode."

Shipping:

once the sensor pod 122 exits the factory, it may switch into a shipping mode during which it may log (in a low-power state) environmental information regarding its handling and/or environment. For example, the device may record number and magnitude of acceleration "shocks" to which it is subjected and/or maximum/minimum temperature during shipping. Upon reaching its destination, it may be triggered (using trigger event 202) to transmit a shipping communication that includes the logged/recorded information. This information may be stored within a cloud based database and "linked" to the device for access by the device's manufacturer and/or technical support. In FIG. 7, scenes 700 and 702 show pallets, cases, or cartons 302 of sensor pods 122 shipping to their destination. During shipping, sensor pods 122 record their environmental conditions (e.g., accelerations, temperature, etc.). In the example of FIG. 7, sensor pod 122(3) has recorded that it was dropped or shaken in a particular manner. In scene 704, sensor pods 122 are received and are collectively triggered (e.g., using trigger event 202) to report their presence and condition (e.g., using communication 123). This condition report indicates their maximum experienced shock and maximum/minimum temperatures, for example. This step is also a convenient means to count, based upon received communications 123, the number of sensor pods 122 that survived the shipping. In scene 706, once this reporting is complete, sensor pods 122 are transitioned to the "user mode," for example using a transmission from master device 102 and/or trigger event 202.

User:

in the typical user mode, triggering sensor pod 122 causes it to pair with another master device to enable continued communication with that other device. In FIG. 8, once sensor pods 122 have transitioned into "user mode" at the completion of the shipping mode, each sensor pod 122 is paired with a particular master device 102(3). In this example, master device 102 is a smartphone and operates to display information from sensor pod 122. Scene 800 shows generation of trigger event 202 by tapping master device 102(3) against sensor pod 122(1). In this example, both devices contain accelerometers or similar inertial device, and are able to detect the vibration resulting from the tap. In scene 802, once recognition of trigger event 202 occurs, devices 102(3) and 122(1) exchange information that enables them to pair with each other. Normally this pairing only has to happen once. Scene 804 shows use of the paired master device 102(3) and sensor pod 122(1), wherein communicated information from sensor pod 122(1) is received and displayed by master device 102(3).

Diagnostic:

a diagnostic mode may be enabled during which the transmitted message may include results of self-tests. This information may be sent to the cloud based database for access by the device's manufacturer and/or technical support.

In FIG. 9, diagnostic mode is precipitated when it's necessary to troubleshoot sensor pod 122(1). As shown in scene 900, master device 102(3) sends out a special diagnostic message as a trigger event 202 to transition sensor pod 122(1) into diagnostic mode. Trigger 202 may be implemented as and of the above described means (e.g. a special tap sequence). As shown in scene 902, master device 102(3) then sends out diagnostic messages and sensor pod 122(1) responds with appropriate replies. As shown in scene 904, master device 102(3) sends a message to transition sensor pod 122(1) from diagnostic mode into its previous mode.

Devices 102 and 122 may transition through the manufacturing mode, the shipping mode, the user mode, and the diagnostic mode in any order without departing from the scope hereof. For example, different discernable trigger events 202 may transition sensor pod 122 into a specific mode.

Examples of Devices

Master device 102 and sensor pod 122 may represent, but are not limited to, one of: a phone, a laptop, a camera, a mouse, a keyboard, a personal navigation device, a watch, a smart watch, an electronic fitness monitoring device, a foot pod, a heart rate monitor, wireless headphones, a bike power meter, a cycling computer, a lactic acid sensor, an electronic printer, a barcode scanner, a 3D printer, and a data communications radio.

Examples of Wireless Communication

Transceivers 107 and 127 and communication 123 may implement one or more of, but are not limited to: Bluetooth, Bluetooth Low Energy, Bluetooth Smart, ANT/ANT+, Zigbee, Modulated light pulse (LiFi), WiFi, Ultra-wideband communications, GSM/GPRS/LTE, Acoustic wave modulation (ultrasonic, infrasonic, or audible acoustic wave), and IR.

Examples of Sensors Used to Detect Triggers

Trigger sensors 104; 124 are selected to implement one or more of: accelerometer tap detection that includes impulse in acceleration, periodic acceleration, predefined pattern of tapping, gyroscope rotation detection that includes start of rotation, sudden change in rotation rate, magnetic orientation change that includes start of rotation, sudden change in rotation rate, magnetic field change that includes magnet-Hall effect switch trigger, magnetic reed switch trigger, capacitance change that includes a capacitive touch sensor, electromagnetic radiation present including RFID, NFC, and modulated light pulse, piezoelectric sensor impulse, contact switch, strain, shear, deformation in material that includes using strain gauge, capacitance change, RF field change, and resistance change, light intensity change, barometric pressure, location or direction of travel that includes exceeding or going below a certain speed, travelling in a specific heading, travelling in a predefined path, entering a geofenced area, exiting a geofenced area, arriving at a predefined location, being within a predefined proximity of a location, being within communication range of a personal area network (PAN), wide area network (WAN), or another RF beacon.

Logic for Selection of Communication Partner(s)

In situations where there are multiple devices and sensor pods using a certain communications protocol and that are actively transmitting or receiving specific messages at a given time, master device 102 and sensor pods 122 include logic to determine and schedule the communications. There are several methods by which this may be achieved. The nearest/furthest sensor pod may be chosen, as determined by one or both of: Received Signal Strength (RSS) or RSSI from communication 123, and Signal to Noise Ratio (SNR) from communication 123. RSS/RSSI/SNR may be viewed as either a secondary trigger, or as a trigger characteristic. For example, trigger event 202 may be an initial trigger, and then a gesture (e.g., running or cadence detection) may be a secondary trigger to start pairing, logging, streaming, and/or some other form of generic action/response.

All sensor pods 122 within a certain area may be chosen as determined by similar mechanisms. The sensor pod that has the most similar trigger signal characteristics may be chosen, based upon one or more of: amplitude of detected trigger event 202 (e.g. detected tap/rotation rate), frequency content of detected trigger event 202, and a tap pattern of trigger event 202. One or more sensor pods 122 may be chosen based upon their position in a list, such as one of: a list consisting of one or more allowable or authorized sensor pods, a list consisting of one or more sensor pod type or sensor type, a list of one or more sensor pods as defined by a database, a list of one or more devices as defined by date of manufacture, a list of one or more sensor pods ordered by most recently triggered, a list of one or more sensor pods ordered by least recently triggered, a list of one or more sensor pods as defined by capability, and a list of one or more sensor pods as defined by those sensor pods triggered within a discrete amount of time.

Examples of Use

Pairing Between Devices

Tap a computing device (e.g., sensor pod 122) which contains one or more trigger sensors 124 such as one or more of accelerometer, gyro, magnetometer/compass, light sensor, proximity sensor, capacitive touch sensor, and imaging sensor, etc. against another computing device (e.g., device 102) to initialize one-way or two-way communication (e.g., communication 123) between these two devices.

Waking Up Another Device and Extracting Status Information

Tap master device 102 against one or more sensor pods 122 to gain information from those sensor pod. Such information may include, but is not limited to: battery charge status from sensor pod, sensor pod ID, sensor pod type, sensor pod capability, sensors present on sensor pod, sensor pod operating mode, trigger type (e.g., amplitude, and/or other characteristics of a given trigger), sensor pod health status, current time, and time of trigger as measured by the sensor pod.

Inventory Tracking

Triggering one or more sensor pods 122 (e.g., by turning on a light, shaking carton 302 containing sensor pods 122, etc.) and counting the number of responding sensor pods to determine the number of units present in a shipment of goods.

Storing the list of devices present at various stages of transport to ensure goods arrive at their intended destination and to provide last known location for goods missing during transport.

Time Transfer

Triggering one or more sensor pods 122 and sending a time stamp message from master device 102 defining a time of trigger. Sensor pods 122 that are triggered use the time stamp message to update their internal real-time clock. Trigger event 202 itself may be used to improve time syncing. For example, where two devices 102, 122 are tapped together, sensor pod 122 starts counting up time increments on its internal clock, and master device 102 sends the time stamp at the moment the trigger event is detected. Upon receiving the time stamp, sensor pod 122 corrects latency of the time stamp using the accumulated time increments. Thus, sensor pod 122 has better time synchronicity with master device 102.

In assisted GPS (A-GPS or aGPS) applications, where sensor pod 122 includes a GPS receiver and master device 102 is a smartphone, a trigger event 202 of tapping master device 102 and sensor pod 122 together sends a time stamp message from master device 102 to sensor pod 122. The time stamp message may include a latest known position of the smart phone to aid GPS time to first fix within sensor pod 122 by providing the GPS receiver with an initial position, since trigger event 202 ensures that devices 102 and 122 are collocated. The smartphone may also share satellite ephemeris information with sensor pod 122 to further improve time to first fix by giving the GPS receiver satellite position information.

Updating

Information is transferred as it's being collected by different devices 102, 122 on an ongoing basis. For example, during a triathlon a first device 102/122 may collect performance information (e.g., position, speed, calories, etc.) as a user swims using one or more sensors located in the bathing cap. At the end of the swim, that information may be transferred to a second device 102/122 located on a bicycle (e.g., a bike power meter) by tapping the first device with the second device. When the user has completed the bike ride, the swim information and bike ride information collected by the second device during the bike ride may be transferred to a third device 102/122 positioned within running shoes by tapping the second device on the third device. And so on.

Manufacturing/Shipping/User/Diagnostic Modes

Master device 102 and sensor pod 122 may each include a series of modes through which it progresses when triggered. When master device 102 and/or sensor pod 122 is within a manufacturing mode, a trigger may initiate execution of one or more manufacturing tests, such as one or more of: electronic and software integrity tests, sensor self-tests, and so on. Once the sequence of manufacturing tests is complete, master device 102 and/or sensor pod 122 may automatically transition into a shipping mode that logs items of interest during transit, such as one or more of: G-shocks, temperature exposure, and so on.

Once the shipped master device 102 and/or sensor pod 122 is received and accounted for, master device 102 and/or sensor pod 122 may automatically transition into the user mode to allow the user to pair master device 102 and/or sensor pod 122 with another device, such as a watch or smartphone, to allow master device 102 and/or sensor pod 122 to operate as designed to provide user functionality.

Special Triggering

If problems with master device 102 and/or sensor pod 122 arise, a special trigger may be used to transition master device 102 and/or sensor pod 122 into a diagnostic mode. As a result of transitioning into this diagnostic mode, master device 102 and/or sensor pod 122 may initiate self-test and report any anomalies.

Anti-Spoofing

If two devices (e.g., master device 102 and sensor pod 122) experience a trigger, one or more trigger characteristics (e.g., tap intensity) may be used to authenticate a connection between these devices and prevent a 'spoofing' device, which is operating nearby and constantly transmitting a response signal (e.g., communication 123) as if it were a triggered device, from fooling either of the two devices into forming a connection. For example, a sensor pod A is attempting to form a connection by continually sending a spoof communication 123. When master device B and sensor pod C are triggered nearby, master device B is expecting to receive communication 123 from sensor pod C. To prevent an unwanted connection to sensor pod A, upon receiving communication 123, master device B uses one or more trigger characteristics (e.g., one or more of tap intensity, ambient light intensity, ambient temperature, and so on) sensed by the sensor pod and included within communication 123 to determine authenticity of communication 123 based upon trigger conditions sensed within master device B. Where trigger characteristics within communication 123 do not correspond with sensed trigger characteristics within master device B, the connection is not formed. Master device B may then receive communication 123 from sensor pod C, which contains trigger conditions that correspond to the sensed trigger conditions of master device B, thereby resulting in formation of a connection between master device B and sensor pod C.

Combination of Features

Features described above as well as those claimed below may be combined in various ways without departing from the scope hereof. The following examples illustrate possible, non-limiting combinations the present invention has been described above, it should be clear that many changes and modifications may be made to the process and product without departing from the spirit and scope of this invention:

(A) A method pairs a wireless sensor pod using trigger events. An inertial sensor detects, within the wireless sensor pod, a first trigger event caused by physical movement of the wireless sensor pod. When the first trigger event is detected, the wireless sensor pod transmits a communication to pair the wireless sensor pod with a master device.

(B) In the method denoted as (A), the communication including first information of the first trigger event. The wireless master device authenticates the communication by matching the first information to second information corresponding to the first trigger event.

(C) In the methods denoted as (A) and (B), the second information being determined from one or more sensors within the wireless master device in response to the first trigger event.

(D) In any of the methods denoted as (A) through (C), the first trigger event caused by a sequence of physical movement, wherein authentication is based upon matching the sequence within the first information to the sequence within the second information.

(E) In any of the methods denoted as (A) through (D), further including generating the trigger event from an actuator within the wireless master device.

(F) In any of the methods denoted as (A) through (E), the sequence of physical changes being predefined.

(G) In any of the methods denoted as (A) through (F), the communication being implemented as one or more of: Bluetooth, Bluetooth Low Energy, Bluetooth Smart, ANT/ANT+, Zigbee, Modulated light pulse (LiFi), WiFi, Ultra-wideband communications, GSM/GPRS/LTE, Acoustic wave modulation (ultrasonic, infrasonic, or audible acoustic wave), and IR.

(H) In any of the methods denoted as (A) through (G), the communication including time of trigger as measured by the wireless sensor pod.

(I) In any of the methods denoted as (A) through (H), the communication further including one or more of: battery charge status of wireless sensor pod, device ID, device type, device capability, sensors present on the wireless sensor pod, wireless sensor pod operating mode, trigger type, health status of the wireless sensor pod, and current time of the wireless sensor pod.

(J) In any of the methods denoted as (A) through (I), when the wireless sensor pod is in a manufacturing mode the step of transmitting including: performing at least one manufacturing self-test within the sensor pod, transmitting results of the at least one manufacturing self-test, and transitioning the sensor pod to a shipping mode upon completion of the step of transmitting.

(K) In any of the methods denoted as (A) through (J), when the wireless sensor pod is in a shipping mode, the step of transmitting including: transmitting environmental information detected and stored within the wireless sensor pod while in the shipping mode, and then transitioning from the shipping mode to a user mode when a second trigger event, distinguishable from the first trigger event, is detected by the inertial sensor.

(L) In any of the methods denoted as (A) through (K), when the wireless sensor pod is in a user mode, the step of transmitting including: transitioning into the diagnostic mode, initiating a sequence of diagnostic self-tests, and transmitting results of the diagnostic self-tests.

(M) In any of the methods denoted as (A) through (L), the physical movement including acceleration of the wireless sensor pod, wherein the inertial sensor has an accelerometer.

(N) In any of the methods denoted as (A) through (M), the physical movement including rotation of the wireless sensor pod, wherein the inertial sensor has a gyroscope.

(O) A wireless sensor pod is configured to use a trigger event to pair with a master device. The wireless sensor pod includes an inertial sensor for detecting physical movement of the wireless sensor pod, a wireless transceiver, a processor communicatively coupled to the inertial sensor and the wireless transceiver, and a memory communicatively coupled with the processor and storing machine readable instructions that when executed by the processor are capable of: detecting, using the inertial sensor, a first trigger event caused by the physical movement, and when the first trigger event is detected, transmitting, using the wireless transceiver, a communication to pair the wireless sensor pod with a master device.

(P) In the wireless sensor pod denoted as (O), the communication includes first information of the first trigger event. The wireless master device authenticates the communication by matching the first information to second information corresponding to the first trigger event.

(Q) In either of the wireless sensor pod denoted as (O) and (P), the second information being determined from one or more sensors within the wireless master device in response to the first trigger event.

(R) In any of the wireless sensor pods denoted as (O) through (Q), the first trigger event including a sequence of physical movement, wherein the authentication is based upon matching the sequence within the first information to the sequence within the second information.

(S) In any of the wireless sensor pods denoted as (O) through (R), the trigger event being generated by an actuator within the wireless master device.

(T) In any of the wireless sensor pods denoted as (O) through (S), the sequence of physical changes being predefined.

(U) In any of the wireless sensor pods denoted as (O) through (T), the communication being implemented as one or more of: Bluetooth, Bluetooth Low Energy, Bluetooth Smart, ANT/ANT+, Zigbee, Modulated light pulse (LiFi), WiFi, Ultra-wideband communications, GSM/GPRS/LTE, Acoustic wave modulation (ultrasonic, infrasonic, or audible acoustic wave), and IR.

(V) In any of the wireless sensor pods denoted as (O) through (U), the communication including time of trigger as measured by the wireless sensor pod.

(W) In any of the wireless sensor pods denoted as (O) through (V), the communication further including one or more of: battery charge status of wireless sensor pod, device ID, device type, device capability, sensors present on the wireless sensor pod, wireless sensor pod operating mode, trigger type, health status of the wireless sensor pod, and current time of the wireless sensor pod.

(X) In any of the wireless sensor pods denoted as (O) through (W), further including machine readable instructions that are executed by the processor when the wireless sensor pod is in a manufacturing mode and are capable of: performing at least one manufacturing self-test within the wireless sensor pod, transmitting results of the at least one manufacturing self-test using the wireless transceiver, and transitioning the wireless sensor pod to the shipping mode.

(Y) In any of the wireless sensor pods denoted as (O) through (X), further including machine readable instructions that are executed by the processor when the wireless sensor pod is in a shipping mode and are capable of: transmitting, using the wireless transceiver, environmental information detected and stored within the wireless sensor pod while in the shipping mode, and then transitioning from the shipping mode to a user mode when a second trigger event, distinguishable from the first trigger event, is detected by the inertial sensor.

(Z) In any of the wireless sensor pods denoted as (O) through (Y), further including machine readable instructions that are executed by the processor when the wireless sensor pod is in a user mode and are capable of: transitioning the wireless sensor pod into a diagnostic mode, initiating a sequence of diagnostic self-tests within the wireless sensor pod, and transmitting results of the diagnostic self-tests using the wireless transceiver.

(AA) In any of the wireless sensor pods denoted as (O) through (Z), the physical movement including an acceleration of the wireless sensor pod, wherein the inertial sensor has an accelerometer.

(AB) In any of the wireless sensor pods denoted as (O) through (AA), the physical movement including a rotation of the wireless sensor pod, wherein the inertial sensor has a gyroscope.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for pairing a wireless sensor pod using trigger events, comprising:
    detecting, using an inertial sensor within the wireless sensor pod, a first trigger event caused by physical movement of the wireless sensor pod;
    when the first trigger event is detected, transmitting, from the wireless sensor pod, a communication to pair the wireless sensor pod with a master device; and
    when the wireless sensor pod is in a manufacturing mode the step of transmitting comprising:
        performing at least one manufacturing self-test within the sensor pod;
        transmitting results of the at least one manufacturing self-test; and
        transitioning the sensor pod to a shipping mode upon completion of the step of transmitting.

2. The method of claim 1, when the wireless sensor pod is in a user mode, the step of transmitting comprising:
    transitioning into a diagnostic mode;
    initiating a sequence of diagnostic self-tests; and
    transmitting results of the diagnostic self-tests.

3. A method for pairing a wireless sensor pod using trigger events, comprising:
    detecting, using an inertial sensor within the wireless sensor pod, a first trigger event caused by physical movement of the wireless sensor pod;
    when the first trigger event is detected, transmitting, from the wireless sensor pod, a communication to pair the wireless sensor pod with a master device; and
    when the wireless sensor pod is in a shipping mode, the step of transmitting comprising:
        transmitting environmental information detected and stored within the wireless sensor pod while in the shipping mode; and then
        transitioning from the shipping mode to a user mode when a second trigger event, distinguishable from the first trigger event, is detected by the inertial sensor.

4. A wireless sensor pod configured to use a trigger event to pair with a master device, comprising:
    an inertial sensor for detecting physical movement of the wireless sensor pod;
    a wireless transceiver;
    a processor communicatively coupled to the inertial sensor and the wireless transceiver; and
    a memory communicatively coupled with the processor and storing machine readable instructions that when executed by the processor are capable of:
        detecting, using the inertial sensor, a first trigger event caused by the physical movement;
        when the first trigger event is detected, transmitting, using the wireless transceiver, a communication to pair the wireless sensor pod with the master device;
    when the wireless sensor pod is in a manufacturing mode, performing at least one manufacturing self-test within the wireless sensor pod;
        transmitting results of the at least one manufacturing self-test using the wireless transceiver; and
        transitioning the wireless sensor pod to a shipping mode.

5. A wireless sensor pod configured to use a trigger event to pair with a master device, comprising:
    an inertial sensor for detecting physical movement of the wireless sensor pod;
    a wireless transceiver;
    a processor communicatively coupled to the inertial sensor and the wireless transceiver; and
    a memory communicatively coupled with the processor and storing machine readable instructions that when executed by the processor are capable of:
        detecting, using the inertial sensor, a first trigger event caused by the physical movement;
        when the first trigger event is detected, transmitting, using the wireless transceiver, a communication to pair the wireless sensor pod with the master device;
    when the wireless sensor pod is in a shipping mode, transmitting, using the wireless transceiver, environmental information detected and stored within the wireless sensor pod while in the shipping mode; and then
transitioning from the shipping mode to a user mode when a second trigger event, distinguishable from the first trigger event, is detected by the inertial sensor.

\* \* \* \* \*